United States Patent [19]

Reggiani

[11] Patent Number: 4,632,083
[45] Date of Patent: Dec. 30, 1986

[54] INJECTION UNIT FOR INTERNAL COMBUSTION ENGINES FED WITH GASEOUS FUELS SUCH AS LIQUEFIED PETROLEUM GAS OR METHANE

[75] Inventor: Medardo Reggiani, Reggio Emilia, Italy

[73] Assignee: MED di Reggiani Medardo, Reggio Emilia, Italy

[21] Appl. No.: 701,247

[22] Filed: Feb. 13, 1985

[30] Foreign Application Priority Data

Apr. 4, 1984 [IT] Italy .................... 46829 A/84

[51] Int. Cl.⁴ .................................... F02B 43/00
[52] U.S. Cl. ..................... 123/527; 123/27 GE; 123/577; 48/180 R; 48/189
[58] Field of Search ............... 123/527, 27 GE, 577; 48/189.1, 180.1

[56] References Cited

U.S. PATENT DOCUMENTS 3,540,419 11/1970 Fox ............................. 123/27 GE
4,449,509 5/1984 Young ........................... 123/527
4,505,249 3/1985 Young ........................... 123/527

FOREIGN PATENT DOCUMENTS 84219 7/1983 European Pat. Off. ....... 123/27 GE

Primary Examiner—E. Rollins Cross
Attorney, Agent, or Firm—Brisebois & Kruger

[57] ABSTRACT

A gaseous fuel injection unit for internal combustion engines fed with gaseous fuel such as liquefied petroleum gas or methane, comprises at least one volumetric measuring device (7) arranged to feed during each engine cycle a determined volume related to the piston displacement, and into which there is fed and respectively discharged that quantity of gaseous fuel complying with the required mixture ratio of fuel to air drawn in by the engine during each cycle. A control unit (5) senses operating pressures along the intake pipe system (1), namely in the injection zone (19) and in the zone (18) downstream of the throttle valve (2), in order to control an expander unit (10, 11) which feeds the gaseous fuel to the volumetric measuring device (7) at a pressure equal to the sum of the absolute values of the two pressures at the aforesaid points, and to control said volumetric measuring device.

7 Claims, 2 Drawing Figures

INJECTION UNIT FOR INTERNAL COMBUSTION ENGINES FED WITH GASEOUS FUELS SUCH AS LIQUEFIED PETROLEUM GAS OR METHANE

In internal combustion engines fed with gaseous air/fuel mixtures using for example liquefied petroleum gas (L.P.G.) or gaseous methane as the fuel, the fuel is contained, in its gaseous or liquefied state, in a convenient vessel at a relatively high pressure, from which it is withdrawn and after undergoing pressure reduction by throttling through successive stages is fed in the gaseous state to the engine air intake duct, known hereinafter as the "intake pipe system".

For this feed system, pressure reduction apparatus are known which, by way of a suitable device known as a "mixer", feed the gaseous fuel to the intake pipe systems.

The gaseous fuel is withdrawn by said mixer, as the result of vacuum in said pressure reducer.

As the degree of vacuum in the mixer, which is influenced not only by the form of this latter but also by the form of the intake pipe system, does not vary in a manner complementary to the variation in the delivery of the pressure reducer, mixing is not always correct.

Basically, this known type of feed does not ensure that the correct fuel/combustion air ratio is maintained under all operating conditions.

For these reasons, internal combustion engines fed for example with L.P.G. in accordance with the aforesaid known art are subject to nonoptimum operation.

For example, fuel feed may be incorrect at maximum or idling speeds, or again at maximum or minimum loads, due to the fact that metering of the mixture does not conform to the optimum fuel/combustion air ratio over a large part of the engine operating range, irrespective of the load.

This is due to the fact that generally the delivery curve of reducers of known type, ie the quantity of gas delivered as a function of the vacuum created in their outlet connector, does not follow the same pattern as the intake curve, ie as the vacuum which the quantity of air passing into the intake pipe system creates at the end of the mixer tube which is connected to the reducer outlet connector.

Consequently, correct mixing can be obtained only at the points of intersection of the two curves, or in close proximity thereto.

The object of the present patent is to propose and protect a unit for injecting gaseous fuel into an internal combustion engine, said unit being able to ensure correct engine feed at the required mixture ratio over the entire operating range, and to thus optimise its use under all operating conditions.

The main idea on which the invention is based is to relate the volume of gaseous fuel to be injected on the average during each cycle to the piston displacement of the respective engine to be fed, and to correspondingly vary the pressure of the fed gaseous fuel as the engine operating conditions vary, by making it practically equal to the sum of the absolute pressure at the point of injection of the gaseous fuel into the intake pipe system and the absolute pressure in the intake manifold downstream of the throttle valve, so that the quantity of fuel fed always complies with the correct fuel/air mixture ratio.

This is attained according to the invention by providing a volumetric gaseous fuel measuring device which is arranged to feed the engine, for each engine cycle, with a gaseous fuel volume which is in the same ratio to the piston displacement as the required air/fuel mixture ratio, the term "cycle" signifying the completion of the intake stages of all the engine cylinders.

According to the invention, said volumetric measuring device operates in combination with a controlled expander unit arranged to feed said volumetric measuring device with fuel in the gaseous state at a pressure which varies with the engine operating conditions and is equal to the sum of the aforesaid pressures; at least one pressure transducer arranged to sense the absolute pressure downstream of the throttle valve in the engine intake pipe system; at least one pressure transducer arranged to sense the absolute pressure at the point at which the gaseous fuel is injected into said intake pipe system; and a control unit arranged to process the pressures sensed by said at least two pressure transducers and to control said expander unit in such a manner as to cause this latter to feed the volumetric gaseous fuel measuring device at an absolute pressure which is identical to the sum of the two absolute pressures sensed by the pressure transducers, and to control said volumetric measuring device in such a manner as to cause it to feed on the average the gaseous fuel volume required by the piston displacement of the engine during each operating cycle thereof.

By virtue of this, for each engine rotational speed and for each engine load condition, a quantity of gaseous fuel is fed into the intake pipe system which complies with the optimum mixture ratio with respect to the quantity of intake air, as shown on the basis of the following considerations, in which:

$V_M$ indicates the volume fed on the average by said volumetric measuring device during each cycle;

$P_M$ indicates the pressure of the gaseous fuel volume $V_M$;

$P_I$ indicates the absolute pressure in that zone of the intake pipe system into which the gaseous fuel is injected;

$P_C$ indicates the absolute pressure in that zone of the intake pipe system downstream of the throttle valve;

$V_C$ indicates the engine piston displacement.

During each cycle, the gaseous fuel quantity which passes on the average from the volumetric measuring device to the intake pipe system depends not only on $V_M$ but also on $P_M - P_I$.

During each engine cycle, the quantity of mixture of air plus gaseous fuel which passes from the intake manifold to the cylinder or cylinders depends not only on $V_C$ but also on $P_C$.

Thus if the ratio $V_C:V_M=25$ (eg. for L.P.G.) and if $P_M-P_I=P_C$, then the intake mixture which completely fills the cylinder or cylinders must contain air and gaseous fuel in the ratio of 24:1.

In order for this to happen, $P_M$ must obviously always be kept equal to $P_I+P_C$, and this is the purpose of the control unit.

It is also apparent that the fuel quantity, which depends on $P_M$, will always match the engine load conditions, in that as the load increases the sum of $P_I$ and $P_C$ and thus $P_M$ increases, with the exception of an insignificant transient state close to idling.

Moreover, the fuel quantity remains correct even as atmospheric pressure and thus the weight of combustion air varies, in that $P_M$ varies as $P_I$ varies.

According to a preferred embodiment of the invention, the volumetric measuring device can consist in theory of at least one metering vessel of determined volume, and preferably of at least two such vessels arranged to operate alternately such that one is completely full when the other is completely empty and vice versa.

The constructional characteristics and merits of the invention will be more apparent from the detailed description of a preferred embodiment thereof given hereinafter by way of non-limiting example with reference to the accompanying figures.

Figure 1:
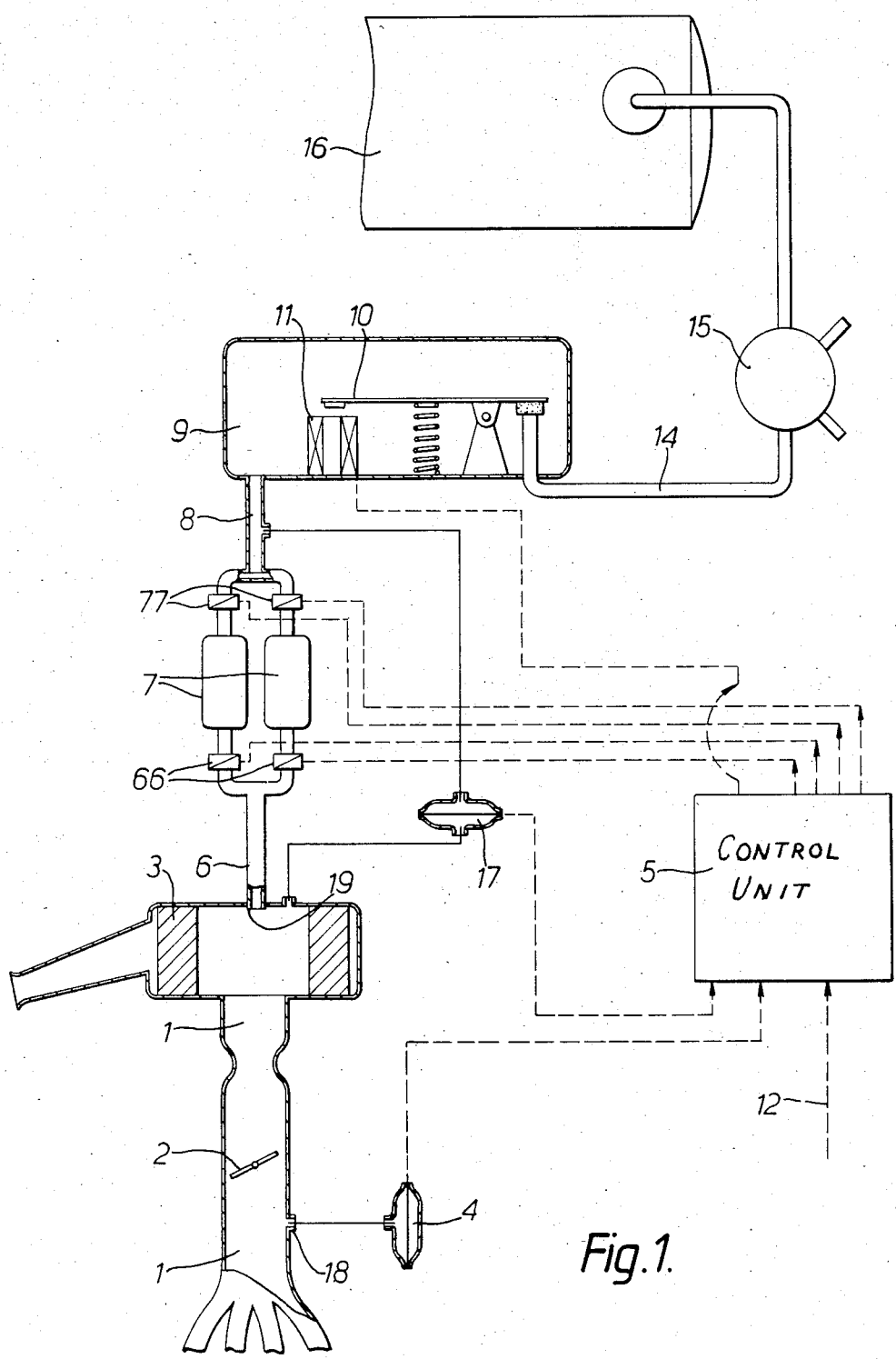
FIG. 1 shows a complete scheme of the unit according to the invention.

The accompanying FIG. 1 shows diagrammatically a normal intake pipe system 1 which in the illustrated example comprises a manifold for a four-cylinder internal combustion engine.

The number of engine cylinders is however not important.

The pipe system 1 is provided with a normal throttle valve 2 connected to the accelerator pedal in known manner, said pipe system 1 comprising a likewise normal air filter 3.

In addition, a pressure transducer 4 is connected to the pipe system 1 downstream of the throttle valve 2 in order to sense the absolute pressure at the point 18 in the pipe system.

The pressure transducer 4 is connected to an electronic control unit 5.

An injection duct 6 opens into a zone 19 of the pipe system 1 at the centre of the filter 3 as shown in the figure, and is connected by way of respective solenoid valves 66 to a pair of vessels 7 of determined volume which themselves communicate by way of convenient solenoid valves 77 with a manifold 8. The solenoid valves 66 and 77 are alternately controlled by the electronic unit 5 so that they close and open synchronously with the engine operation, as will be more apparent hereinafter.

The manifold 8 is connected to a controlled expander unit or pressure regulator, which comprises a casing 9, a throttle/expansion valve 10 and an electromagnetic control device 11 for this latter, said device 11 being controlled by the electronic unit 5 in such a manner as to maintain the expander outlet pressure equal to the sum of the pressures in the zones 18 and 19.

For practical reasons, instead of sensing the pressure in said injection zone 19, the pressure at any point in the injection duct 6 for the already metered gaseous fuel can be sensed, this being substantially identical.

The electronic unit 5 is also connected to a suitable engine member (not shown) as indicated by 12, to measure the engine r.p.m.

Said valve 10 receives a duct 14 originating from a pre-expansion/heating chamber 15 for the fuel, which is contained in a normal container or tank 16.

As stated, the fuel can be methane or liquefied petroleum gas (L.P.G.).

It can also be seen from the accompanying figure that said electronic unit 5 is connected to a differential pressure transducer 7, the two connectors of which are connected respectively to the zone 19 inside the air filter 3 and to the interior of the manifold 8 in order to sense the difference in the pressures thereat. This difference is transduced and fed to the unit 5.

Finally, according to the invention, each vessel 7 has a volume which is strictly related to the piston displacement of the respective engine or, in other words, each vessel 7 is able to contain a gaseous fuel quantity which is related to said piston displacement in accordance with a ratio, variable according to the fuel characteristics, equal to the required fuel/combustion air ratio.

For example, with reference to the accompanying figure, in which the volume of each vessel 7 is equal to one twenty-fifth of the total engine piston displacement, and in which said volume is fed into the intake pipe system 1 during each engine cycle, each vessel contains, at the pressure existing in the manifold 8, a gaseous fuel quantity which is of such a ratio to the combustion air quantity induced into the cylinders during each cycle, as would give rise to a volumetric gaseous fuel/combustion air mixture ratio of 1.24.

The said unit is able to automatically adjust itself as the external environmental conditions such as atmospheric pressure vary, or when the engine load varies, said automatic adjustment being such as to always maintain said fuel/air mixture ratio at its optimum value.

In this respect, the pressure at 19 is constantly subtracted from the pressure at 8, and the result compared with the pressure at 18 as sensed by the pressure transducer 4, so as to maintain their values constantly equal.

Synchronously with the engine operation, the vessels 7 are alternately filled and emptied of gaseous fuel at the pressure in 8, by virtue of the fact that the feed and discharge valves are controlled by the signals from the electronic unit 5.

More specifically, the absolute pressure at 8 is maintained at a value equal to the sum of the two absolute pressures at 18 and 19 respectively, said pressure at 8 being maintained by means of 10, which is itself controlled by 5. Basically, the unit operates in such a manner as to maintain the differential pressure measured by 17 equal to the absolute pressure sensed at 18, or in other words to maintain the absolute filling pressure of the vessels 7 equal to the sum of the two absolute pressures present at 18 and 19.

Consequently, the electronic unit 5 monitors and processes all the signals fed to it by 4, 12 and 17, in order finally to feed control signals to the electromagnetic device 11 and to the solenoid valves 66 and 77.

Consequently, the said unit regulates the pressure in the manifold 8 by means of the electromagnetic device 11, and also by means of said valves 77, 66 controls respectively the filling of the vessels 7 with gaseous fuel and their emptying synchronously with the engine operation.

From the aforegoing it is apparent that when the pressure at 18 or 19, or at both, varies, the electronic unit 5 instantaneously adjusts the pressure at 8 by means of the controlled expander 10, 11.

Figure 2:
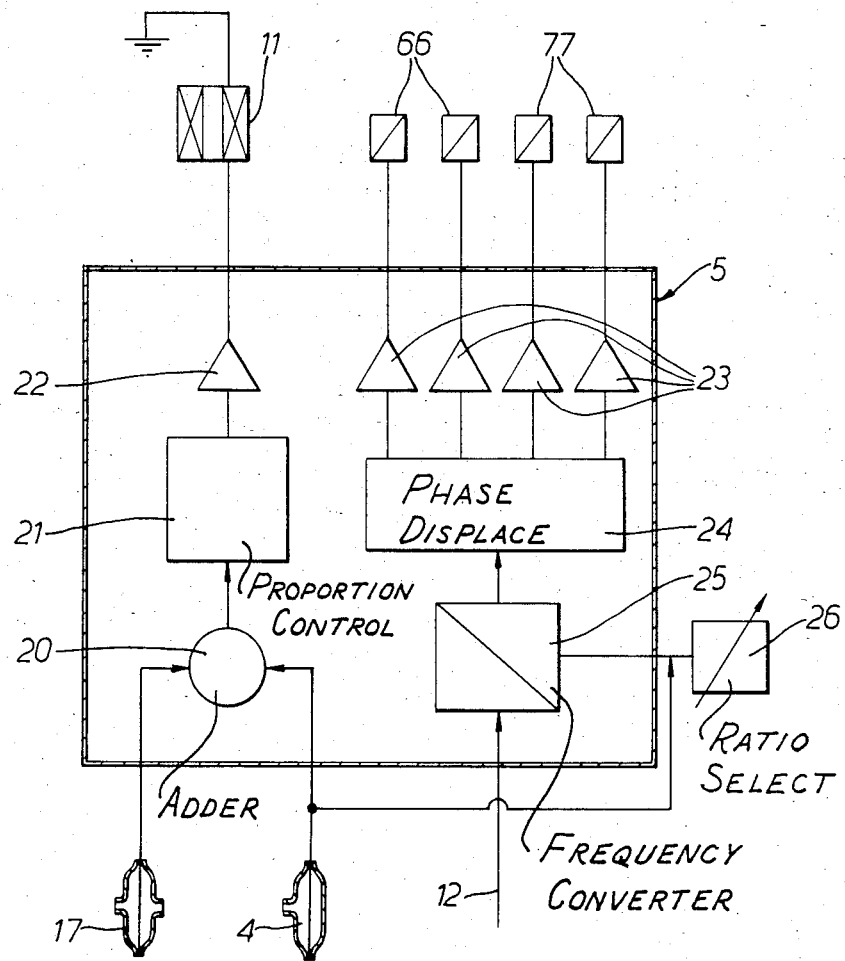
FIG. 2 is a block diagram of the control unit according to the invention, in an electronic form.

The electronic unit 5 is described hereinafter with reference to FIG. 2.

It consists of two parts with independent logic. The first part comprises the adder block 20, proportional-integral controller block 21 and power amplifier block 22. It controls the pressure $P_M$ by comparing the signals from the two pressure transducers 4 and 17 and driving the device 11 with a signal which is a function of the measured error (the function is of PI, ie proportional-integral type).

The second part consists of a frequency converter 25, a phase displacement or delay circuit 24 and power amplifiers 23. It derives the control signals for the solenoid valves 66 and 77 from the engine rotational speed.

In particular, it is possible to modify the conversion ratio by means of a selector 26 in order to be able to adapt the volume of gaseous fuel fed from the vessels 7 during each cycle to different engine piston displacement values.

Said conversion ratio, under particular engine operating conditions, for example during acceleration, can also be varied as a function of the vacuum sensed by the pressure transducer 4, in order to facilitate vehicle pick-up.

From the aforegoing, it is apparent that the volumetric measuring device can be of a type different from the said type comprising two vessels 7, and that the volume delivered by the measuring device during each metering cycle can be chosen independently of the piston displacement of the said engine, provided the number of measuring device operating cycles per unit of time is suitably modified in accordance with the number of engine cycles per unit of time, this being easily done through the electronic unit 5 by means of the conversion ratio selector 26.

It is also apparent that the second part of the said electronic unit, ie for controlling the emptying frequency of the vessels 7 by way of the valves 66 and 77, can be formed mechanically by means of a group of suitably shaped and phased cams rotating at a speed related to the engine speed.

Likewise, the first part of the control circuit can be formed by pneumatic means, as will be apparent to any expert of the art.

The invention is not limited to the single embodiment described heretofore, and modifications and improvements can be made thereto but without leaving the scope of the inventive idea, the basic characteristics of which are summarised in the following claims.

I claim:

1. An injection unit for internal combustion engines fed with gaseous fuels such as liquefied petroleum gas or methane, said injection unit comprising, at least one volumetric measuring device for feeding on the average a determined volume of gaseous fuel during each engine cycle directly into an intake pipe system of said engine, upstream of a throttle valve of the engine; controlled expander unit means for feeding gaseous fuel to said volumetric measuring device at a pressure $P_M$ equal to the sum of the the absolute pressures $P_I$ and $P_C$ existing respectively at the location at which the gaseous fuel is injected into said intake pipe system and a location in the intake manifold downstream of the throttle valve; and control means for controlling said volumetric measuring device and said controlled expander unit means in accordance with said pressures $P_M$, $P_I$, and $P_C$, and in accordance with the engine rotational speed.

2. An injection unit for internal combustion engines as claimed in claim 1, wherein said volumetric measuring device comprises at least one vessel (7) of predetermined volume, which is controlled in such a manner that it fills and empties at a frequency related to the engine rotational speed.

3. An injection unit as claimed in claim 2, wherein at least one vessel (7) is provided with respective filling (77) and emptying (66) solenoid valves controlled by said control unit (5) in relation to the engine rotational speed.

4. An injection unit as claimed in claim 1, wherein said controlled expander unit is connected at its inlet to a tank (16) by way of a fuel pre-expansion and heating chamber (15), and comprises a casing (9) housing a throttle/expansion valve (10) controlled by an electromagnetic control device (11) which is driven by said unit (5) in such a manner as to constantly maintain the filling pressure of said at least one vessel (7) equal to the sum of said two pressures $P_I$ and $P_C$.

5. An injection unit as claimed in claim 1, wherein the control unit (5) comprises two parts with independent logic, of which the first part is provided for controlling said expander unit (10, 11), and the second part is provided for controlling the volumetric measuring device.

6. An injection unit as claimed in claim 5, wherein said second part comprises a frequency converter (25) which receives a signal proportional to the engine rotational speed and, by way of a phase displacement device (24) and suitable power amplifiers (23), feeds control signals in sequence to the valves (66) and (77) provided for filling and emptying the at least one metering vessel (7), there being provided for selecting the conversion ratio of the converter (25) a device (26) which is sensitive to the vacuum sensed by the pressure transducer (4) and can be manually adjusted.

7. An injection unit as claimed in claim 5 wherein said first part comprises control means for adding together pressure proportional signals indicative of $P_I$, and $P_C$, from pressure transducers connected respectively to said intake pipe system and the intake manifold, and for generating and feeding resulting control signals to a proportional-integral controller for controlling an electromagnet for operating the expander unit to maintain $P_M$ propotional to the sum of $P_I$, and $P_C$.

* * * * *